(12) United States Patent
Casile et al.

(10) Patent No.: US 7,984,473 B1
(45) Date of Patent: Jul. 19, 2011

(54) SYSTEM AND METHOD FOR THE COORDINATION OF SHORT-TERM CYCLIC DATA AND EPHEMERAL CONTENT IN A BROADCAST STREAM

(75) Inventors: Olivier Casile, Saint Laurent du Var (FR); Richard S. Chernock, Newtown, CT (US); Paolo Dettori, Bedford Hills, NY (US); Frank A. Schaffa, Hartsdale, NY (US); David I. Seidman, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 2644 days.

(21) Appl. No.: 09/593,573

(22) Filed: Jun. 14, 2000

(51) Int. Cl.
*H04N 7/173* (2011.01)

(52) U.S. Cl. ........... 725/116; 725/93; 725/132; 709/219

(58) Field of Classification Search .......... 725/134–136, 725/139–142, 109–116; 709/217–231
See application file for complete search history.

(56) References Cited

U.S. PATENT DOCUMENTS

| | | | | |
|---|---|---|---|---|
| 5,301,028 | A | 4/1994 | Banker et al. | 348/570 |
| 5,428,417 | A | 6/1995 | Lichtenstein | 353/122 |
| 5,633,678 | A | 5/1997 | Parulski et al. | 348/232 |
| 5,712,994 | A | 1/1998 | Jefferson et al. | 345/342 |
| 5,822,123 | A | 10/1998 | Davis et al. | 348/564 |
| 5,929,849 | A * | 7/1999 | Kikinis | 725/113 |
| 5,986,650 | A | 11/1999 | Ellis et al. | 345/327 |
| 6,002,394 | A * | 12/1999 | Schein et al. | 725/39 |
| 6,029,045 | A * | 2/2000 | Picco et al. | 725/34 |
| 6,047,317 | A * | 4/2000 | Bisdikian et al. | 725/142 |
| 6,052,715 | A * | 4/2000 | Fukui et al. | 725/114 |
| 6,078,348 | A * | 6/2000 | Klosterman et al. | 725/40 |
| 6,288,738 | B1 * | 9/2001 | Dureau et al. | 725/109 |
| 6,298,373 | B1 * | 10/2001 | Burns et al. | 709/203 |
| 6,317,885 | B1 * | 11/2001 | Fries | 725/109 |
| 6,357,042 | B2 * | 3/2002 | Srinivasan et al. | 725/32 |
| 6,459,427 | B1 * | 10/2002 | Mao et al. | 725/109 |
| 6,496,896 | B1 * | 12/2002 | Inoue | 710/306 |

(Continued)

OTHER PUBLICATIONS

Mankovitz, Method and apparatus for time-shifting video and text in a text-enhanced television program, Oct. 29, 1998, WO 98/48566.*

*Primary Examiner* — Annan Q Shang
(74) *Attorney, Agent, or Firm* — Anne Vachon Dougherty

(57) ABSTRACT

A system and method allowing a broadcaster to deliver short-term cyclic data along with the main content of the broadcast stream, synchronized with that main content, and for allowing users to have access to that information for longer periods than a typical data broadcast system would allow. Additional data content is added to the main content stream and is broadcast along with it. The additional data content is initially broadcast shortly prior to the time of its relevance to the main content and is buffered upon reception. In addition, it is rebroadcast cyclically over a short period, allowing viewers who tune in late to take advantage by acquiring the material during and briefly after the time of its initial relevance. If a viewer tunes in after the cyclic broadcast period has elapsed or if there was an error in the receiving or buffering of the additional data content, a return channel can be used to request that the material be retransmitted. If an insufficient number of viewers request a particular piece of material, it may be narrowcast to those viewers over their telephone lines. For a larger number of requests, a rebroadcast will be scheduled.

24 Claims, 4 Drawing Sheets

U.S. PATENT DOCUMENTS

| | | | |
|---|---|---|---|
| 6,571,392 B1 * | 5/2003 | Zigmond et al. | 725/110 |
| 6,658,661 B1 * | 12/2003 | Arsenault et al. | 725/54 |
| 6,668,158 B1 * | 12/2003 | Tsutsui et al. | 455/12.1 |
| 6,745,391 B1 * | 6/2004 | Macrae et al. | 725/42 |
| 6,870,573 B2 * | 3/2005 | Yeo et al. | 348/569 |
| 6,886,178 B1 * | 4/2005 | Mao et al. | 725/52 |
| 7,269,838 B1 * | 9/2007 | Boyer et al. | 725/51 |
| 7,386,871 B1 * | 6/2008 | Knudson et al. | 725/92 |

* cited by examiner

SYSTEM AND METHOD FOR THE COORDINATION OF SHORT-TERM CYCLIC DATA AND EPHEMERAL CONTENT IN A BROADCAST STREAM

FIELD OF THE INVENTION

The invention relates generally to broadcasting of signals and more particularly to the delivery of short-term cyclic data with the regular content of a broadcast stream.

BACKGROUND OF THE INVENTION

The emergence of digital television broadcasting systems requires a change in traditional methods of communication and management, both between central distribution sites and remote stations and between remote stations and clients. Since data will be broadcast along with video and audio, aspects of the new systems will concern how data is reliably distributed among these entities, and how that data is stored. Since the television viewing environment is significantly different from other environments for the dissemination of data (such as the Internet), the architecture used for broadcasting data utilized in interactive applications must differ correspondingly. Specifically, accommodation must be made for late tuners (i.e., viewers who tune to a channel after a data downloading opportunity has elapsed), frequent channel changing, and the rapid speed of changing scenes during a television program, in contrast with the viewers' alacrity in responding to on-screen prompts which are related to those scenes.

Methods for broadcast distribution of data objects are known in the art. U.S. Pat. No. 5,613,065 describes a system for information broadcasting utilizing error check codes to determine if a remote client has received a broadcast without error. U.S. Pat. No. 4,908,828 describes the use of cyclic retransmission and CRC testing of a packetized broadcast. U.S. Pat. No. 5,631,907 utilizes cyclic transmission, block numbering and forward error correction for broadcast file distribution along with point-to-point communications to a particular station if blocks are not received after the last cycle. All of these methods require periodic retransmission of the data objects to ensure reliable reception, at a cost of increased bandwidth.

U.S. Pat. Nos. 5,222,061 and 5,535,229 describe systems that utilize retransmission of incorrectly received packets based upon individual requests by the client. These systems operate in point-to-point mode and do not take advantage of the broadcast nature existing for a digital television broadcast system. U.S. Pat. No. 5,619,689 adds the capability of aggregating retransmission requests through hub servers, but operates in a point-to-point message-acknowledgement system.

U.S. Pat. No. 4,868,866 describes a method for broadcasting database updates where the updates are modified by comparing the updated material to a record of what had been previously transmitted. This method requires that the central distribution site be aware of the state of data objects at each receiving client.

U.S. Pat. No. 5,666,293 describes a method of downloading software through a broadcast channel, where cyclic transmission of packetized data is used for reliable reception. In this method, the same content is broadcast to all clients and the client is responsible for deciding which data to download.

What is needed is a system for the distribution of content which is added to and associated with a TV program, or program segment, which makes the content available even to viewers who tune in after the program or segment has begun. It is therefore an object of the invention to provide such a system.

Another object of the invention is to provide a system that, in addition to providing a basic access window for viewers to receive content associated with a TV program, provides a mechanism for viewers to obtain the associated content after the basic access window has expired, using re-broadcasts.

Yet another object of the invention is to provide a system which allows for the retransmission of content to late requesters, which retransmission is performed in a bandwidth-conserving manner.

Still another object of the invention is to provide a system which allows for an on-request narrowcast if one or more users requests content after it is no longer efficient to rebroadcast the content.

SUMMARY OF THE INVENTION

The foregoing and other objects are realized by the present invention which pertains to broadcasting systems which have the capability to include additional data content with the regular main broadcast content. Digital or analog signals (typically video and audio signals) are broadcast from a central component at a broadcasting location, and are received by the user's, or viewer's, receiving component at the user location. This receiving component, typically a set-top box (STB) which is connected to the user's television set, receives the additional data content which is broadcast and executes an application which utilizes the additional data content. The additional data content is usually broadcast once, shortly prior to its relevance to the main content being viewed. The additional data content is buffered and displayed to the viewer at the appropriate time.

To avoid the scenario in which all late tuners (i.e. those tuning in to the main content program or commercial after its first few seconds) are excluded from participation in the interactive functions, one proposed solution is to repeatedly broadcast the additional data content throughout the main content (i.e., commercial message). Since the additional data content is potentially quite large (e.g. interactive program applets, high-resolution images, etc.), periodic rebroadcast throughout the period of display of the main content program or commercial message may not be feasible or cost-effective. Therefore, a method is provided by which additional data content can be broadcast along with the main content of a program or commercial message, in a manner which accommodates late tuners, while efficiently utilizing network bandwidth. The additional data content is broadcast shortly prior to its relevance (e.g., at the beginning of a commercial message) and briefly thereafter.

Once the brief cycle of broadcasts of the additional data content have terminated, viewers (or their equipment) who actively request rebroadcast of the additional data content during a limited time window may obtain that additional data content via requests which are transmitted over a return channel. Since, in the television environment, very large numbers of users may be viewing the main content, the possibility exists that an unmanageable number of simultaneous retransmission requests may be sent upstream. To alleviate the "back channel flooding" which can occur due to multiple simultaneous retransmission requests and responses thereto, the invention provides for staggering of the retransmission requests, either at the STB or at intermediate nodes, to spread out the requests over time, reducing the number which are received at the server at any one time interval.

Additionally, the invention provides for a counting mechanism, whereby additional data content is rebroadcast on demand only if a significant number of viewers request it. If an insufficient number of viewers request the material, it may be narrowcast to the requesters over alternative transport (such as the phone line).

BRIEF DESCRIPTION OF THE DRAWINGS

The invention will now be described in greater detail with specific reference to the appended drawings wherein.

DETAILED DESCRIPTION OF THE PREFERRED EMBODIMENT

Figure 1:
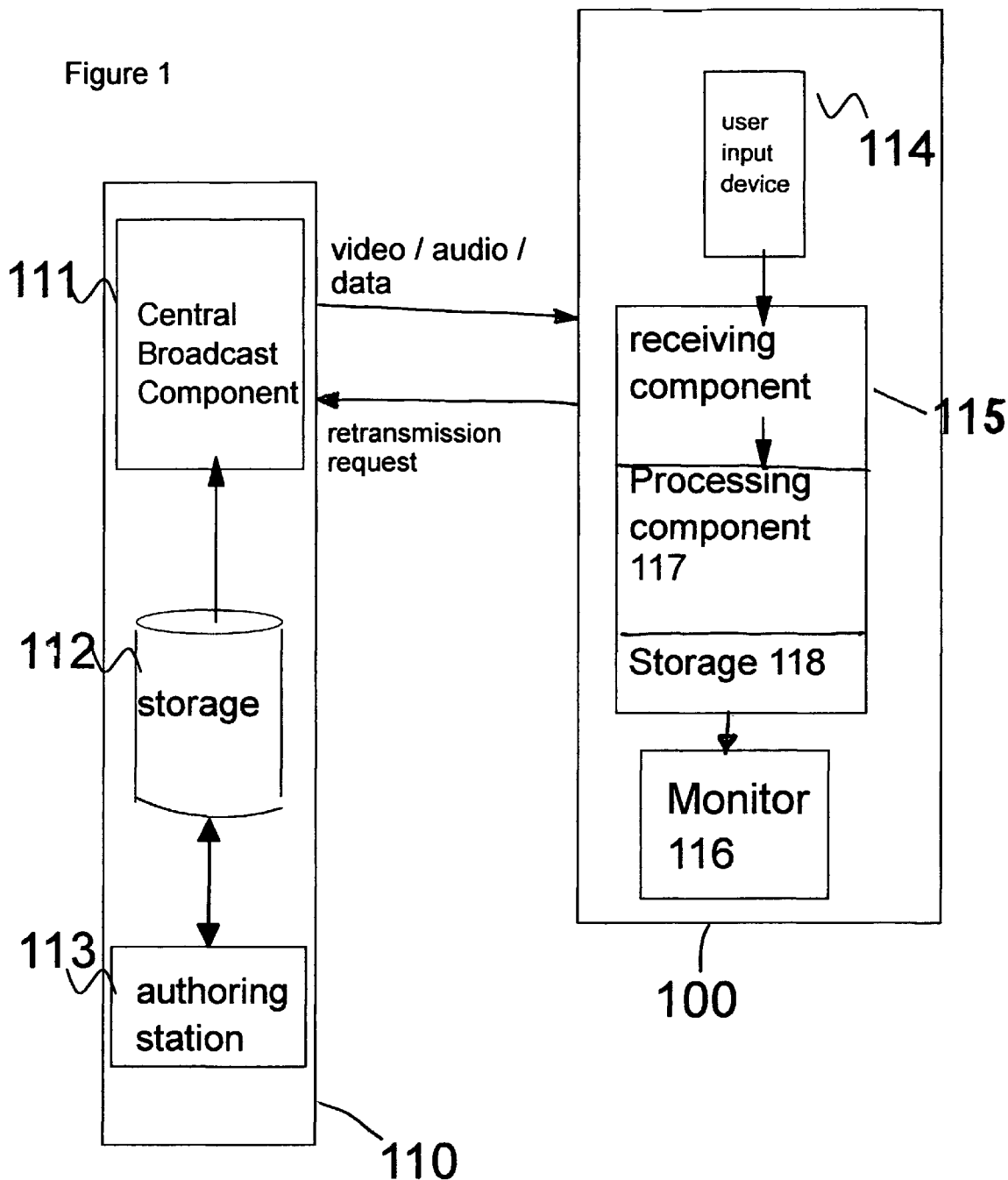
FIG. 1 shows a typical architecture for the broadcast distribution of main content with additional data content, in one embodiment of the present invention.

The following terms are used in the ensuing description:

Additional data content—Secondary data content (such as text, graphics, or an interactive TV application) which is added by the broadcaster to the primary or main broadcast content (q.v.) and is extracted and presented to the viewer by the receiving component at a user location.

Additional data content broadcast—A broadcast which contains additional data content (q.v.).

Brief cyclic broadcast—The repeated broadcasting of additional data content (q.v.) over a brief segment of the main content broadcast program.

Cyclic data—In the context of this invention, additional data content (q.v.) which is broadcast multiple times in the course of a program or commercial message.

Interactive TV application—An application which is executed on the receiving component at the user's or viewer's location, which allows the viewer to interact with that equipment, usually by means of a remote control, in order to perform a function or service. For example, a purchasing application in which the viewer makes selections from on-screen choices, using a remote control interface.

Main content—The primary content of an audio or an audio-video broadcast stream to which the additional data content pertains (also known as "primary content" or "ephemeral" content).

Narrowcast—A broadcast which is addressed to a subset of the usual broadcast audience, and which may be delivered by alternative media other than the original broadcast media.

Rebroadcast—A repeat broadcast of content which has been broadcast previously. In the context of this invention, a rebroadcast is a repeat broadcast of the additional data content.

Retransmission—A repeat transmission (broadcast or narrowcast) of content which has been previously transmitted.

Retransmission request—A request (by the viewer or the viewer's equipment) for the retransmission of content.

Retransmission window—The range of time during which retransmission requests (q.v.) may be accommodated.

Scheduling information—Information which describes when in the future a particular item or items of secondary content is to be added to the broadcast.

Secondary content—Data (text, graphics, programs, etc.) Which are supplemental to the primary content of a broadcast and are added to that broadcast.

Synchronization—In the context of the present invention, the time coordination between regular broadcast content (q.v.) and additional data content (q.v.).

Timing Information—Information which describes when a particular item of secondary content is relevant to the primary content. For example, an image of a particular actor may be relevant to the entire program in which the actor appears, or only to those scenes in which the actor appears.

The invention will first be described with reference to the system illustrated in FIG. 1. The broadcasting location 110 of the illustrated system (at the left of FIG. 1) includes at least one authoring station 113 at which streams of the so-called secondary content are created and/or added to the primary content, a storage location 112 for storing created main content streams and for providing same to a central broadcast component in response to scheduled or random requests, and a central broadcast component 111, which includes means for establishing and conducting communications (whether broadcast transmissions, telephone communications, etc.) with at least one user location.

A typical scenario for the creation of a service which adds and distributes data in a broadcast stream for the purpose of disseminating additional information and/or for the purpose of enabling other interactions, such as purchasing, is as follows: (a) main content, such as a video/audio commercial, is developed or obtained, for the purpose of a broadcast advertisement and is stored at a storage location 112 which can be accessed by the central broadcast component 111; (b) advertisers, wishing to enhance their advertisements, arrange for creation of additional data content to be added to the main content, which is synchronized with the main content using authoring tool 113 and may be stored therewith at storage location 112, which additional data content may be provided for enabling interactive applications which may already be stored locally at the user's location or for delivering the interactive capabilities in the additional data content; (c) the enhanced advertisement (i.e., comprising one or more streams which include the main content and the additional data content) is broadcast from the central component 111 to a user location 100, wherein the viewer may interact with the additional data content for the purposes of obtaining additional information and/or making purchases.

The user or viewer location 100 has a receiving component 115, such as a set-top box or an I/O component of a personal computer, for receiving the input signal and for outputting that signal to a monitor 116 (which may be a computer monitor, a television set, etc.) The receiving component 115 includes a processing component 117 for processing user input and for executing such applications as may be stored at a user storage location associated with the receiving component or which may be downloaded as additional data content. The user location 100 additionally includes at least one user input device 114, which may be a television remote control, a computer keyboard, a touchscreen at the monitor, a keypad, a microphone, a custom purchasing interface, a touchtone telephone, etc. The user location may additionally include, either at the receiving component or as separate components (not shown), a user storage location 118 for storing the aforementioned interaction applications.

In one embodiment of the present invention, the secondary or additional data content is added to the digital video (and audio) primary content or main content prior to broadcast, by adding the additional data content to an MPEG-2 Transport Stream containing audio and video elementary streams. In a first implementation of the MPEG embodiment, the additional data content which is added is carried in a "private data stream" as defined in the Systems syntax for MPEG-2 Transport streams (see ISO 13818-1). In an alternative second implementation of the MPEG embodiment, the additional data content is carried in an MPEG-2 Private Section table form.

In an alternative embodiment of the present invention, the additional data content is added to the Vertical Blanking Interval (hereinafter, "VBI") portion of the main content analog video (and audio) waveform prior to broadcast.

In both the MPEG and VBI cases, an authoring station or tool 113 of FIG. 1 is used to traverse the main content video frames and to provide the scheduling information indicating when the additional data content is to be provided with the main content. Once inserted, the combined stream, containing video, audio, and data content, may be stored at storage location 112 or may be dynamically streamed for delivery over the broadcast medium. Some examples of broadcast media include terrestrial broadcasting, satellite, and cable (coaxial cable or hybrid fiber-coaxial). The format of the inserted additional data content can be specified by the system designers and need not be the same format as the main content. In one embodiment of the present invention, the additional data content is in the format of HTML or XML (extended mark-up language) tags, which identify additional data and may also encapsulate the additional data.

As mentioned above, the combined stream comprising the main content and the additional data content may be "assembled" and streamed dynamically or it may be stored in a storage device 112 at the broadcasting location. The combined stream is broadcast over the transmission medium (cable, satellite, etc.) and received by the viewers' receiving component 115, which may be a set-top box (STB) connected to prepare (e.g., decode) the stream for display on monitor 116. In addition, the processing component 117 associated with the receiving component 115 detects the presence of additional data content, buffers this additional data content, notifies the user of the existence of the additional data content, parses the content as needed (as in the example of HTML or XML format content) and, when relevant, launches the appropriate application (for example, a browser) to manage this additional data content. In some cases, the additional data content itself will contain an executable application or some part thereof, which the receiving component will execute.

A key aspect of the present invention is the scheduling of delivery of the additional data content in relation to the delivery of the main content of the stream to which that additional data content pertains. For example, the additional data content may be broadcast at the beginning of a short commercial message (the short commercial message comprising the main content to which it pertains), with an optional interactive service being offered to the viewer at the end of the message.

Since channel-surfing is a common and inevitable aspect of viewing behavior, it cannot be expected that all viewers of any program segment have been tuned in since the beginning of that segment. To avoid the scenario in which all late tuners (i.e., those tuning in to the commercial after its first few seconds) are excluded from participation in the interactive functions, one solution to the above problem is to repeatedly broadcast the additional content throughout the commercial message. In that way, viewers can access the additional content data at virtually any time during the display of the main content. However, since the additional data content is potentially quite large (e.g. interactive program applets, high-resolution images, etc.), periodic rebroadcast throughout the program or commercial message may not be feasible or cost-effective. Therefore, a further method is provided by which additional data content can be broadcast along with the main content of a program or commercial message, in a manner which accommodates late tuners, while still efficiently utilizing network bandwidth. Under that alternative method, the data is broadcast cyclically, at least two times during the broadcasting of the main content. The cyclic broadcasting of additional data, for example, once or more shortly prior to its relevance (e.g., at the beginning of a commercial message) and then at least once briefly thereafter as well, can be done according to a pre-set schedule or can be scheduled dynamically based upon such factors as the viewer's response to the secondary content or retransmission requests from the user's location.

A user is notified of the existence of the additional data content, preferably by the display of a notification icon during display of the main content. That notification icon is generally pre-stored at the processing component of the receiving component at the user location. Display of the notification icon is triggered by the inclusion of additional data content in the received broadcast stream. Therefore, when the processing component of the receiving component detects that additional data content is included in the broadcast stream, it automatically invokes display of the notification icon to alert the viewer to the fact that additional data content is available and is being or has been buffered. The STB stores and displays the icon in response to a control message in the additional data, which control message will include duration information, etc. As an alternative, the icon can be pre-stored at the STB, with display thereof being triggered by the control message which accompanies the additional data (e.g., as part of a header thereto, interleaved therewith, or other logical alternative).

The aforementioned control message for triggering display of a notification icon is one example of control information which may accompany the additional data content. Other examples of control information to be included with the additional data content include identification information which identifies the main content (e.g., program or commercial) to which the additional data content pertains. If a receiving component has the identification information, it can more effectively manage its data buffer. For example, if the viewer at the user location changes television channels, the receiving component will recognize that the newly-displayed main content is not the main content which is identified by the identification information. Based on such a determination, the receiving component may decide to delete all previously-stored additional data content from its buffer. Another component of control information is a unique identifier for the additional data content, so that the receiving component will recognize that cyclically rebroadcast additional data content is the same as the additional data content which the receiving component has already received and buffered. By the use of such a unique identifier, the receiving component will avoid duplication of buffering the identical data. Other control information which may be useful includes scheduling information that provides the receiving component with a timetable of when the additional data content is to be related to the main content. As with the program identification information, the scheduling information can assist the receiving component in the effective management of its buffer space. If the amount of secondary data is small (e.g., a few kilobytes), it can be buffered well in advance of its relevance with little impact, even if the STB knows that the information will be provided at least one more time before its time of relevance. If the amount of secondary data is large, however, it may be preferable to wait to buffer the secondary data at a time which is closer to time of its the relevance. Control information may additionally include error detection information for enabling the processing component of the receiving component to determine if the additional data content has been received error-free.

The processing component 117 at the receiving component 115 is adapted to conduct error detection on the additional data content which it is receiving and buffering. By the use of standard error detection codes which are embedded in the broadcast stream, the processing component can determine whether an error-free broadcast of the data has been received. If a broadcast error has been detected, the processing component will either notify the user of that fact and await user input of a retransmission request, or will automatically generate a retransmission request to be sent to the central component at the broadcasting location. In response to receipt of retransmission request(s), based on error detection or other reasons detailed below, the central component at the broadcasting location will either rebroadcast or narrowcast the additional data content, as further discussed hereinafter.

With regard to the generation and transmission of a viewer retransmission request, it is likely that a plurality of viewers may wish to send retransmission requests at the same time, for example when viewing the same commercial message. As such, the broadcasting location could be inundated with requests for retransmission over a short period of time. To avoid the network congestion which would result from a multitude of virtually simultaneous retransmission requests, a request staggering system can be implemented whereby the processing components at the different user locations are programmed to wait for varying amounts of time before transmitting their viewer requests for retransmission to the broadcasting location. In that way, requests for retransmission will be received in a staggered time pattern, thereby avoiding the consequences associated with the multitude of virtually simultaneous retransmission requests.

In most cases, the utilization and display of the additional data content at the user location is optional. It may be left up to the viewer (by responding to on-screen text prompts) to indicate whether or not he or she wishes to interact with the additional data content. This decision may be made for each unit of data which is inserted in the broadcast stream, may be made once per program, or may be predetermined and stored at the receiving component in a viewer's profile, and activated each time the viewer is watching. In the latter case, the receiving equipment must be made aware of the identity of the viewer, as determined by entry of a password, key code, fingerprint scan, or other alternative identifying input. Absent entry of identifying input, the receiving component will "assume" that the viewer is a pre-set default viewer and will invoke the default viewer's profile for the handling of any additional data content.

When the viewer's preferences are pre-established (and this can extend to a knowledge of the viewer's interests), the receiving component can be adapted to dynamically "decide" for the viewer (if desired) which additional data content to store, which to ignore, and which to offer to the viewer for further filtering. Additionally, if desired, the receiving component can be adapted to automatically make retransmission requests for the viewer (without his or her intervention), if content which fits the viewer's preference profile is available for rebroadcast or narrowcast. Furthermore, it may be desirable to stagger retransmission requests over time, so that a great number of requests do not all arrive at the broadcast location at once.

In accordance with the foregoing, and as an example thereof, the additional data content may be an application which involves an optional on-screen printout of some detailed product information related to the main content of a commercial message. The receiving components of viewers who were tuned in at the beginning of the commercial message and of late tuners who tuned in before the end of the brief cyclic rebroadcast period will have obtained and buffered this additional data content. The viewer is notified that additional data content is available by the notification data comprising an on-screen graphic or text. Notification data (i.e. data which indicates that additional data content is available) is displayed either throughout the display of the main content or at a strategic time during that display. If a viewer responds to the notification (by interaction with his input device) indicating that he wishes to view the additional data content, one of two scenarios apply: (a) if the viewer's equipment has obtained the data, it is displayed (in this case printed) from the buffer; or (b) if the viewer's equipment has not obtained the data (because the viewer tuned in too late), a retransmission request is sent on the return channel, and the additional data content is displayed when it is received.

Figure 2:
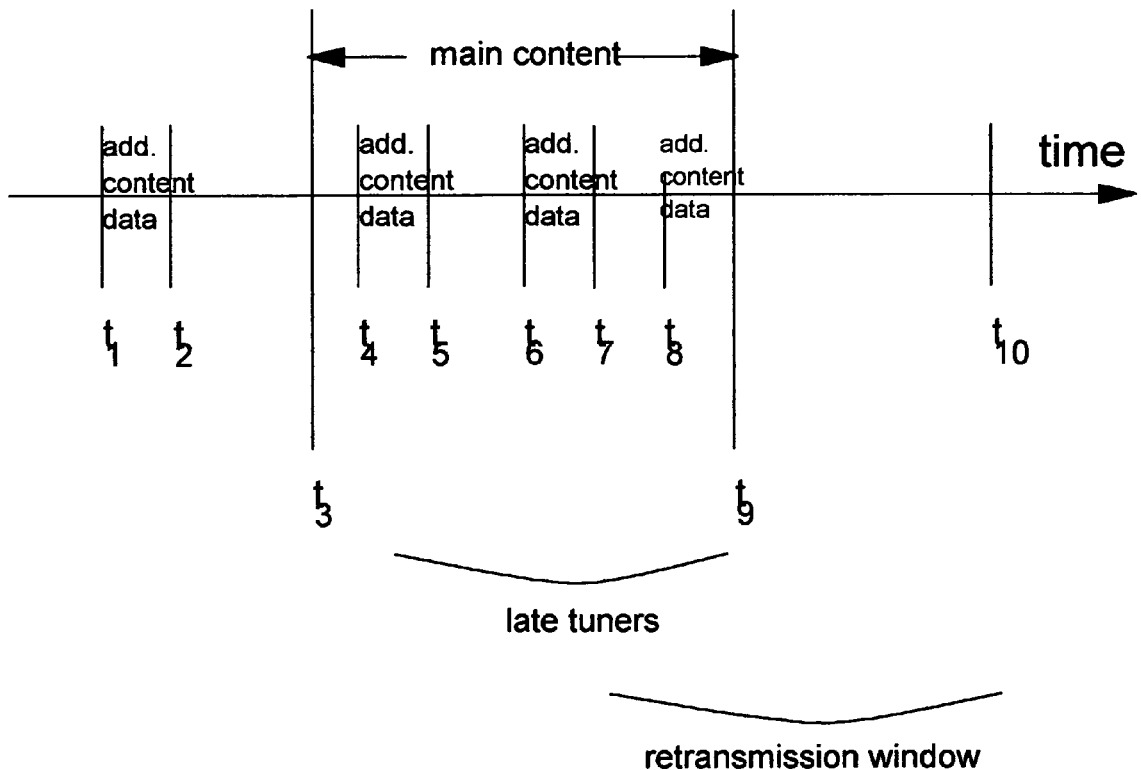
FIG. 2 shows a timing diagram for additional data content distribution, including distribution for tuned-in viewers, late tuners, and viewers requesting retransmission of the additional data content.

With specific reference to FIG. 2, a time line for implementation of the present invention is detailed. The additional data content (for example, some text) is originally broadcast during the time interval t1 to t2, prior to the time of its relevance to the main content and prior to commencement of transmission of the main content at time t3. In the illustration of FIG. 2, the main content is a commercial message which broadcasts in the interval from t3 to t9. The additional data content is rebroadcast, for late tuners (those tuning in after time t3), in the intervals t4 to t5 and t6 to t7. At t8, a standard notification icon, which has been pre-stored at the receiving component, is displayed to indicate to the user that additional data content (in this case, the text) is present. The user can ignore the prompt or can respond to this prompt by providing input to the input device to either access the buffered additional data content from the buffer or to store the additional data content for future viewing/interaction. The buffered content may comprise information which can be output via another peripheral device (e.g., speaker, printer, etc.) at the user location.

From t7 to t10, referred to as the "retransmission window", viewers whose equipment did not previously receive the data (or received it with errors) may send retransmission requests to the central broadcast component at the broadcasting location to request that the additional data content be retransmitted. If a sufficient number of retransmission requests are received at the central component during that retransmission window, then a rebroadcast will be conducted. If the number of retransmission requests received is not sufficiently large to justify "monopolizing" bandwidth with a rebroadcast, however, the central component will instead perform a more limited narrowcast of the additional data content (e.g., by transmitting the information via phone lines or other alternative transmission media) directly to the requesting user location(s).

As noted above, a retransmission request may be generated when the user, or the user's system, detects that additional information was erroneous as received. A retransmission request may also be generated based on the fact that the viewer became aware of the existence of the additional data content (i.e., tuned in) after the last scheduled rebroadcast of that additional data content and, therefore, does not have the additional data content buffered at its receiving component. Alternative scenarios under which retransmission requests may be generated include when the buffer size is inadequate to hold multiple necessary portions of the additional data (e.g., multiple pages of an order form which must be completed by the user); when previously-input user profile information dictates automatic generation of retransmission requests; or, when previous viewer interactions indicate the need for generation of retransmission requests.

Figure 3A:
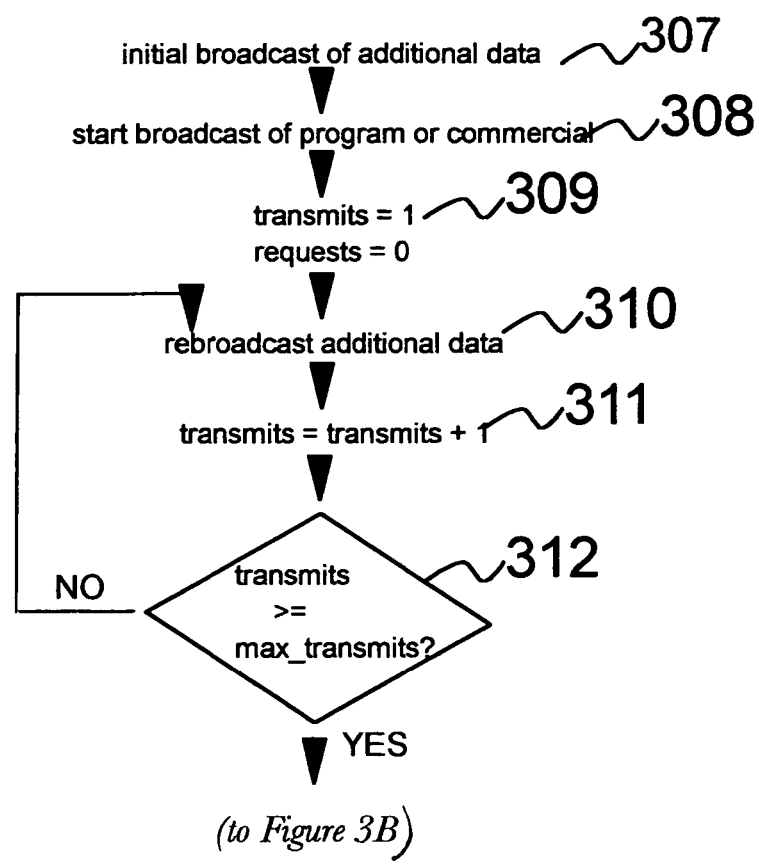
FIGS. 3A and 3B provide a flowchart of the operation of a central broadcast component, or head end, performing the initial broadcast, brief cyclic retransmission, and on-request rebroadcasting or narrowcasting of additional data content.
Figure 3B:
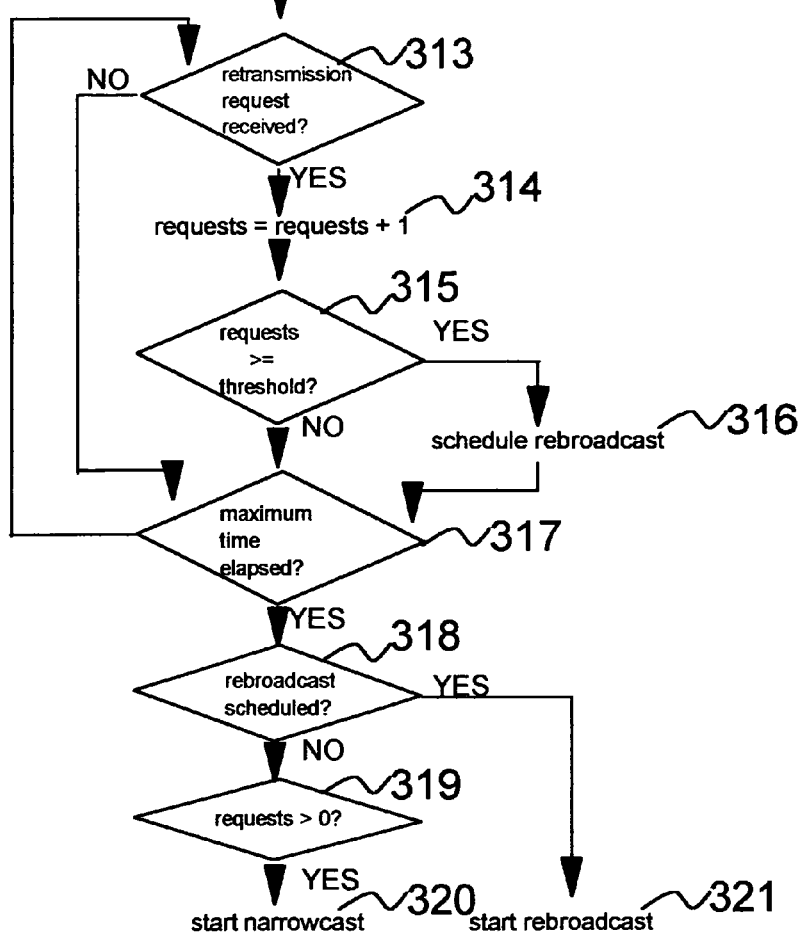

FIGS. 3A and 3B depict a flowchart of a representative process flow for implementing the invention at the broadcasting location. The additional data content is initially broadcast at 307, followed by the start at 308 of display of the main content, such as the program or commercial. A count of transmissions is set to one, while a count of retransmission requests is set to zero at 309. The additional data content is rebroadcast at 310 during the delivery of the main content, and the count of transmissions is incremented at 311 upon each instance of transmitting the additional data content. Once the number of transmissions during the main content program equals the maximum number allotted, as determined at decision box 312, no further broadcasts of the additional data content are conducted. Otherwise, they are continued until the maximum number is reached. The maximum number is a control variable which is pre-set. One logical basis for establishing the maximum number would be length of the main content.

Once the scheduled broadcasts of the additional data content have finished, retransmission requests are considered at 313. A count of rebroadcast requests is incremented at 314; and, if it reaches a pre-set threshold value as determined at step 315, a rebroadcast is scheduled at 316. After a pre-set maximum time has elapsed as determined at 317, if a rebroadcast has been scheduled, as determined at 318, the rebroadcast is started at 321. When the count of retransmission requests has not reached the preset threshold (i.e., a "no" response at 315), if there have been any retransmission requests, as verified at 319, the central component starts a narrowcast at 320.

While the invention has been described with reference to several preferred embodiments, it will be understood by one having skill in the art that modifications may be made without departing from the spirit and scope of the invention as set forth in the appended claims.

Having thus described the invention, we claim:

1. A method for providing secondary content related to primary content from a broadcasting location to at least one user location in a broadcast stream comprising the steps at said broadcasting location of: obtaining secondary content which relates to the main primary content;
creating a schedule for cyclic delivery of said secondary data content in a predetermined relation to the non-cyclic broadcasting of the primary content; and
cyclically delivering said secondary content from said broadcast location to at least one user location based on said schedule.

2. The method of claim 1 wherein said scheduling comprises creating a schedule for a first delivery of said secondary content prior to delivery of the primary content and at least one successive delivery of said secondary content after commencement of delivery of the primary content.

3. The method of claim 2 further comprising dynamically modifying said schedule.

4. The method of claim 3 wherein said dynamically modifying the schedule comprises adjusting the schedule based on viewer interaction with said secondary content.

5. The method of claim 1 further comprising generating at least one viewer request for retransmission automatically at viewer's equipment.

6. The method of claim 5 further comprising receiving said at least one viewer request for retransmission of said secondary content and responding to said at least one viewer request.

7. The method of claim 6 wherein said responding to said at least one viewer request for retransmission comprises rebroadcasting the secondary content.

8. The method of claim 7 further comprising counting the number of viewer requests for retransmission of secondary content and wherein said rebroadcasting is conducted upon receipt of a threshold number of viewer requests for retransmission.

9. The method of claim 6 wherein said responding to said at least one viewer request comprises narrowcasting the secondary content.

10. The method of claim 5 wherein the automatic generating of at least one viewer request for retransmission from viewer's equipment comprises generating at least one viewer request for retransmission based on at least one of viewer profile information and viewer interaction.

11. The method of claim 5 further comprising selectively transmitting said at least one viewer request.

12. The method of claim 1 additionally comprising displaying notification data for notifying the viewer of said delivering of secondary content.

13. The method of claim 1 wherein the transport mechanism for said primary content is an analog television broadcast stream, and the transport mechanism for the secondary content comprises a vertical blanking interval within said analog television broadcast stream.

14. The method of claim 1 wherein the transport mechanism for said primary content is a digital television broadcast stream, and the transport mechanism for the secondary content is an additional data stream within said digital television broadcast stream.

15. The method of claim 1 wherein the secondary content comprises content for use by an interactive television application.

16. The method of claim 1 wherein the secondary content comprises an interactive television application.

17. The method of claim 1 additionally comprising providing control information with said secondary content.

18. The method of claim 17 wherein said providing control information comprises including at least one of a unique identifier for said secondary content, an identification of said primary content to which the secondary content pertains, scheduling information for future broadcasting of secondary content, and timing information regarding relating said secondary content to said primary content.

19. A system for providing secondary content related to primary content in a broadcast stream comprising:
an authoring station for creating a schedule for cyclic delivery of said secondary data content in a predetermined relation to the non-cyclic broadcasting of the primary content; and
a broadcast component for cyclically delivering said secondary content based on said scheduling.

20. The system of claim 19 wherein said broadcast component further comprises means for generating at least one additional retransmission of said secondary content in response to at least one request.

21. The system of claim 20 wherein said means for generating at least one additional retransmission comprises means for transmitting said secondary content over a telephone transmission channel.

22. The system of claim 20 wherein said means for generating at least one additional retransmission comprises means for transmitting said secondary content over a coaxial cable.

23. The system of claim 20 wherein said means for generating at least one additional retransmission comprises means for transmitting said secondary content over a wireless return channel.

24. Apparatus at a viewer location for providing display of primary content and secondary content related to said primary content which is broadcast from a broadcast location comprising:

a receiving component for receiving an input stream from said broadcast location;

a processing component for identifying cyclic secondary content in said input stream and for handling said secondary content;

at least one buffer location for receiving said secondary content of said input stream from said processing component and for buffering said secondary content; and a display component for displaying said primary content from said input stream and for receiving said secondary content from said at least one buffer location and displaying said secondary content;

wherein said processing component comprises means for extracting control information from said input stream and for handling said secondary content based on said control information, and additionally comprising a request component for generating a request for retransmission of said secondary content from said broadcast location.

* * * * *